(12) United States Patent
Hernandez et al.

(10) Patent No.: US 7,104,277 B2
(45) Date of Patent: Sep. 12, 2006

(54) VALVE FOR CONTROLLING A TANK INTERNAL GAS PRESSURE

(75) Inventors: Michel Hernandez, La Colle sur Loup (FR); Aime Goubely, La Trinite (FR); Bruno Sertier, Menton (FR)

(73) Assignee: Eaton Corporation, Cleveland, OH (US)

( * ) Notice: Subject to any disclaimer, the term of this patent is extended or adjusted under 35 U.S.C. 154(b) by 169 days.

(21) Appl. No.: 10/470,220

(22) PCT Filed: Jan. 24, 2002

(86) PCT No.: PCT/FR02/00302

§ 371 (c)(1),
(2), (4) Date: Jan. 26, 2004

(87) PCT Pub. No.: WO02/059512

PCT Pub. Date: Aug. 1, 2002

(65) Prior Publication Data

US 2004/0112437 A1  Jun. 17, 2004

(30) Foreign Application Priority Data

Jan. 25, 2001 (FR) .................................. 01 01026

(51) Int. Cl.
*F16K 17/194* (2006.01)
(52) U.S. Cl. .............................. 137/512.2; 137/493.1; 137/519.5; 137/533.19
(58) Field of Classification Search ............. 137/493.1, 137/512.25, 533.19, 519.5, 493.9
See application file for complete search history.

(56) References Cited

U.S. PATENT DOCUMENTS

| 213,186 | A | * | 3/1879 | Gassett ..................... 137/512.1 |
| 1,724,878 | A | * | 8/1929 | Jensen ...................... 137/512.3 |
| 2,677,939 | A | * | 5/1954 | Clute ......................... 137/389 |
| 2,865,390 | A | * | 12/1958 | Bowen et al. .............. 137/188 |
| 2,974,833 | A | * | 3/1961 | Heppenstall ................ 222/190 |
| 3,603,343 | A | * | 9/1971 | Keller ....................... 137/493.6 |
| 3,768,509 | A | * | 10/1973 | Goda ......................... 137/539 |
| 4,068,680 | A | * | 1/1978 | Sliger ...................... 137/512.1 |
| 4,457,325 | A | * | 7/1984 | Green ......................... 137/39 |

* cited by examiner

*Primary Examiner*—Stephen M. Hepperle
(74) *Attorney, Agent, or Firm*—Anna M. Shih; Roger A. Johnston

(57) ABSTRACT

The invention concerns a control valve (c) for internal gas pressure of a liquid tank co-operating with an orifice (10) provided in the upper part thereof, allowing through a gas flow outside the tank when the difference between the internal pressure and the external pressure reaches a predetermined threshold, and an inverse flow when the internal pressure of the tank is lower than the external pressure. The invention is characterised in that the valve comprises a body (1) whereof the lower part is configured to close the tank orifice (10) with a mass such that beyond said pressure differential value constituting the predetermined threshold, the body (1) is spaced apart from the orifice (10), said body (1) further comprising a through recess (4) arranged in the extension of the tank orifice (10) when they are in contact, said recess (4) being provided with closing means (3) capable of being activated when the differential pressure between the tank and outside atmosphere is positive.

10 Claims, 4 Drawing Sheets

Key: Air flow rate (L/min), Pressure difference dP (kPa)

VALVE FOR CONTROLLING A TANK INTERNAL GAS PRESSURE

The present invention concerns a valve to control the internal gas pressure of a liquid tank, intended to cooperate with an orifice made in the upper part of the tank, by permitting gas flow to the tank when the internal pressure in it is less than the external pressure. This type of valve, in its relation to the tank orifice, must also permit gas flow from the interior to the exterior, when the difference between the internal pressure and external pressure reaches a predetermined threshold.

According to a preferred application, these valves can be used with fuel tanks of automotive vehicles, especially coupled to non-return valves.

Fuel tanks generate a substantial amount of gasoline vapor, whatever their operating phase: during filling, during operation of the motor, on stopping of the motor under elevated temperature conditions, etc. Management of these gasoline vapors is generally accomplished with several specific ventilation valves (return valves, equipped or not with devices of the ball type that prevent overfilling, which can be integrated with a separate valve, purge valve of the vapors during filling of the tank, etc.). The vapors that are collected by these valve mechanisms are directed to an activated carbon filter responsible for storing them, and then purging them regularly to the admission header of the engine on order from a computer integrated in the vehicle that manages engine operation.

It is also often necessary to permit circulation of vapor from the atmosphere to the tank, especially under certain temperature conditions that generate an underpressure in the tank relative to ambient pressure. This is the case, for example, when the gasoline is still hot and the vehicle enters a cold heat environment. It is then necessary to limit the underpressure of the tank that results from this cooling.

In current systems, as mentioned above, management of gasoline vapors is generally accomplished with several distinct ventilation valves that are integrated in the upper part of the gasoline tank and permit collection of said vapors via the activated carbon filter, when the gasoline level does not reach the closure threshold of these valves. Between these valves and said filter, in some configurations a specific type of valve is found, which is mounted in series, the pressure control valve of the tank, which consists of a sealed housing equipped with one or more pneumatic inlet connectors (depending on the number of ventilation valves upstream) and an output connector to the activated carbon filter. This control valve, however, does not exist in all configurations, and especially not when the non-return valve is equipped with a device that prevents overfilling of the ball type and is coupled to a valve to limit the filling level of the tank.

This valve has a dual function. In the first place, in the case of a positive pressure deviation between the tank and the atmosphere, it guarantees purging of the vapors by opening up a passage above a predefined pressure threshold. This pressure threshold for opening, however, is never reached during filling, during which the vapors are collected, for example, by a specific circuit for purging the vapors, arranged parallel to the tank via a line coaxial to the filling tube and discharging in the atmosphere. In the American system, this coaxial line does not exist and it is replaced by a purge valve of the vapors in the direction of the activated carbon filter. In both cases, limitation of filling of the tank and handling of the vapors at moment of filling are only controlled by the parallel system that is provided for this purpose.

In the second place, these pressure control valves of the tank, arranged between the traditional valve mechanisms and the activated carbon filter, must permit inverse flow of vapor, i.e., going from the atmosphere to the tank. This is sometimes necessary during operation of the engine, but more generally on stopping, during rapid cooling of the gasoline in the tank. The underpressure that results from this rapid cooling must be limited by vapor flow from the atmosphere to the tank. This valve therefore is equipped for this purpose with a return flow function.

The drawback of this conventional solution resides mainly in the multiplication of the number of distinct valves and, as a result, the number of specific connections. Multiplication of connection points then increases the risks of permeability relative to anti-pollution standards concerning emissions of gasoline vapors. Moreover, the risks of assembly problems are multiplied and the space requirements for the numerous employed valves are not negligible and represent an additional drawback.

The group of line, connections, etc. also has the drawback of being sensitive to heat fluctuations and chemical attack by the fuel, which leads to a reduction in general reliability of the system for collection and exchange of vapors between the tank and the exterior.

The present invention remedies these drawbacks.

As already mentioned, it concerns very generally a valve to control the internal gas pressure of liquid tanks, cooperating with an orifice made in the upper part of the tank, permitting gas flow to the outside of the tank, when the difference between the internal pressure and the external pressure reaches a predetermined threshold, and inverse flow, when the internal pressure in the tank is less than the external pressure.

It is characterized by the fact that said valve contains a body, whose lower part is configured to close the orifice of the tank with a weight so that beyond said differential pressure value, which represents the aforementioned threshold, the body is separated from the orifice, said body also containing a recess arranged in the continuity of the orifice when they are in contact, said recess, in turn, being equipped with means of blocking that can be activated, when the differential pressure between the tank and atmosphere is positive.

This configuration is very compact and it permits a pressure scheme to be obtained, which is such that, when there is an underpressure in the tank, the fluid can freely pass from the outside, whereas blocking occurs as soon as the pressures equalize, until a predetermined overpressure threshold is reached, which then permits flow of fluid from the tank under an overpressure to the exterior. According to a preferred configuration, which will be seen in greater detail below, this type of valve can be integrated in modular form in a non-return valve. In this case, the valve of the invention has the additional advantage of not requiring any specific connection, which represents a gain in assembly simplicity and space requirements.

This absence of an external connector is also conveyed by a gain in terms of permeability relative to the aforementioned anti-pollution standards.

This solution is also economical, because the required components of small size do not pose any particular design difficulty. Finally, as will also be seen in detail further below, the employed materials are not very sensitive to heat fluctuations or chemical attack from the fuel. They are chosen to have a stability and dimensional precision that guarantee long-term retention of their functional characteristics. The valve of the invention consequently offers high stability and increased reliability.

Preferably, the means of blocking the body of the valve consist of a moving device that is free in translatory movement with radial play in a central part of the traversing recess and can cooperate with a seat, arranged in the upper part of said portion to block the upper part of the recess, said device resting in the lower part of the central portion on a lower stop without blocking at least one line that forms the lower part of the traversing recess, the mobile device having the weight and the recess having a configuration so that, when the internal pressure of the tank exceeds the external pressure, it is forced against the upper seat.

The mechanism of the invention has dual action: when the differential pressure between the tank and the exterior is positive, the force exerted on the main body is not sufficient to separate from the orifice made in the upper wall of said tank. However, it is large enough to create conditions that permit the mobile device to be pushed upward and thus block the recess made in said body, when said device comes in contact with its upper seat.

Beyond a certain threshold of pressure difference, the force exerted on the body of the valve of the invention is sufficient to separate it from the orifice, the fluid then flowing freely. It should be noted that, in addition to overpressure, the respective configurations of the orifice, the seat surrounding it and the lower part of the valve play a role in equilibration of the forces.

Also preferably, the device that is free in translatory movement in the recess consists of a ball that can be moved in a central portion of the cylindrical part of the recess.

According to one possibility, this ball is made of glass with a polished surface, this material offering a density compatible with the sought behavior for the ball, as soon as the differential pressure between the tank and the exterior become positive.

More precisely, the body of the valve of the invention has a cylindrical trend with an essentially hemispherical lower end, the recess being made in the axial direction of said body.

This shape permits high standardization, and it also permits optimal adaptability to the requirements of the vehicle, since the opening pressure of the valve can be modified by adjusting the diameter of the seat of the valve body to the level of the orifice made in the upper part of the tank without it being necessary to modify the dimensions of the valve proper.

For reasons related to manufacture, the lower stop, on which the ball rests, and the line or lines forming the lower part of the recess are made in a distinct part, attached sealed to the body of the valve.

According to one possibility, this part can be force-fit into the main body with a tolerance that leads to adequate tightness.

Guiding of the ball in the central recess of the body should naturally be very dimensionally stable and the material, from which the body is made, will preferably be machined brass. The lower part is preferably made from molded plastic, said plastic being chosen so that it is not dimensionally affected by vapors and/or liquids. It must preserve its dimensional characteristics and not swell, for example, under the influence of fluid.

The invention also concerns a particular application of the above control valve in a tank, whose orifice is equipped on the outside surface of the tank with means of translatory guiding of the valve body. In this case, when the pressure between the interior of the tank and the exterior reaches said predetermined threshold, the valve separates linearly along the axis of said orifice, guided in translatory motion to the exterior of the wall.

Even more precisely, this valve could be integrated, as already mentioned, in a non-return valve arranged in the upper wall of the tank, whose body contains, in the outside output of the connection orifice with the internal volume of the tank, means of translatory guiding of the valve.

This configuration will be the object of detailed explanation in the following description.

The invention will now be described in greater detail, with reference to the appended figures, for which:

Figure 1:
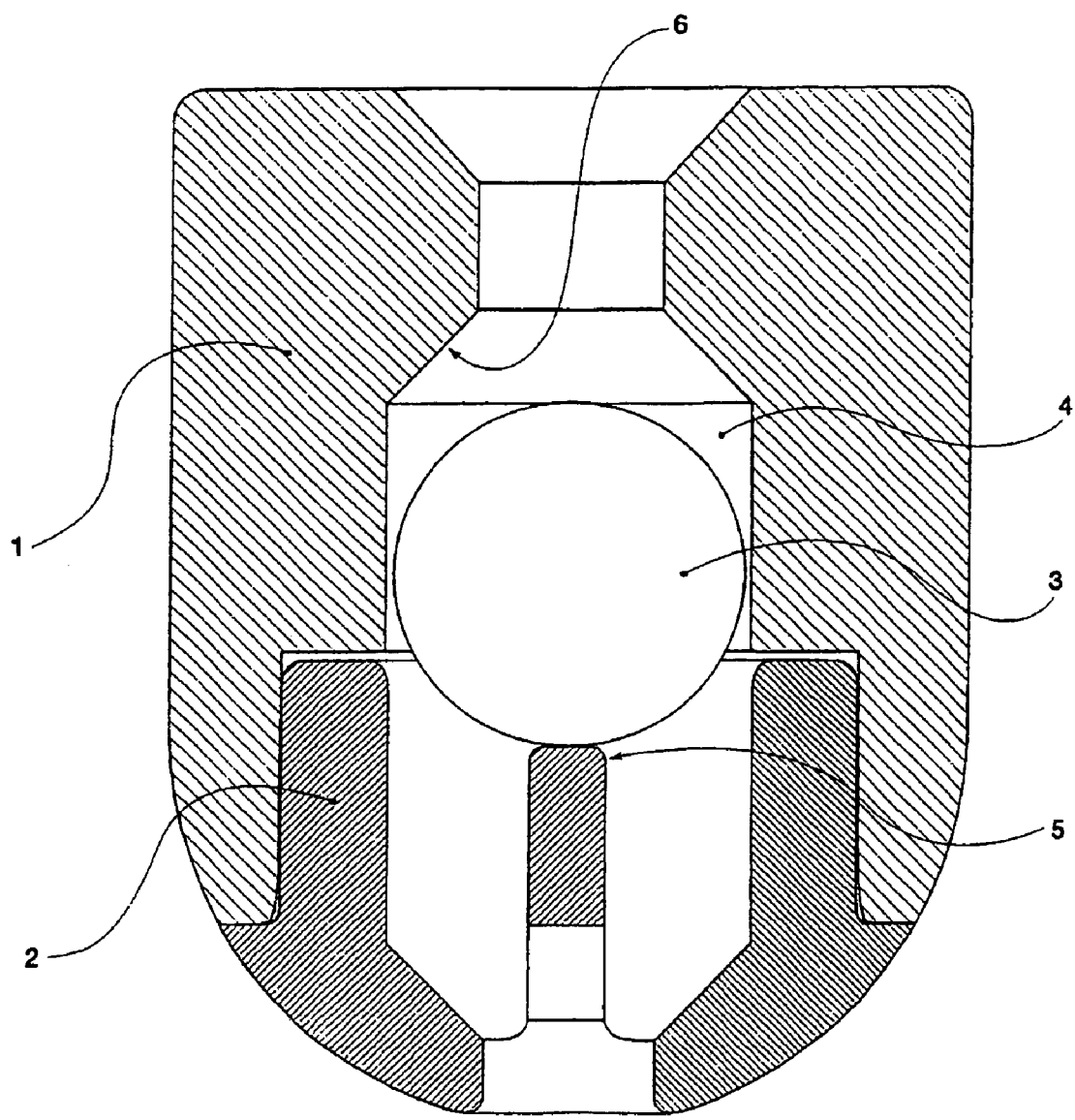
FIG. 1 is a cross-sectional view of a possible configuration of the control valve of the internal gas pressure of the tank according to the present invention.

With reference to FIG. 1, the internal gas pressure control valve (C) of the tank according to the invention consists essentially of a body (1), for example, made of machined brass, and a lower part (2) that serves as seat with a ball (3), preferably made of glass.

Cooperation of these three elements enables one to arrive at a compact configuration equipped with an axially traversing recess or internal line (4) that permits passage of fluid under certain conditions.

Thus, when the ball is in the position in FIG. 1, in contact with a lower stop (5), on which it rests, gas flow is possible, because of the respective dimensions of recess (4) and ball (3), permitting radial clearance.

In other words, the latter has an outside diameter that is less than the diameter of the central cylindrical portion of the recess (4), to generate a loss of load during operation that permits displacement of the ball (3) and closing of the seat (6).

As soon as ball (3) has been pushed upward, in contact with the upper seat (6), flow of all fluid is stopped, owing to circular contact between ball (3) and said upper seat (6).

The lower part (2), which therefore serves as stop (5) for ball (3), itself comes in contact with seat (12) (see the following figures), made at the level of the upper orifice (10) of a tank (not shown), and it is fit tightly into the body (1) of valve (C).

Figure 2:
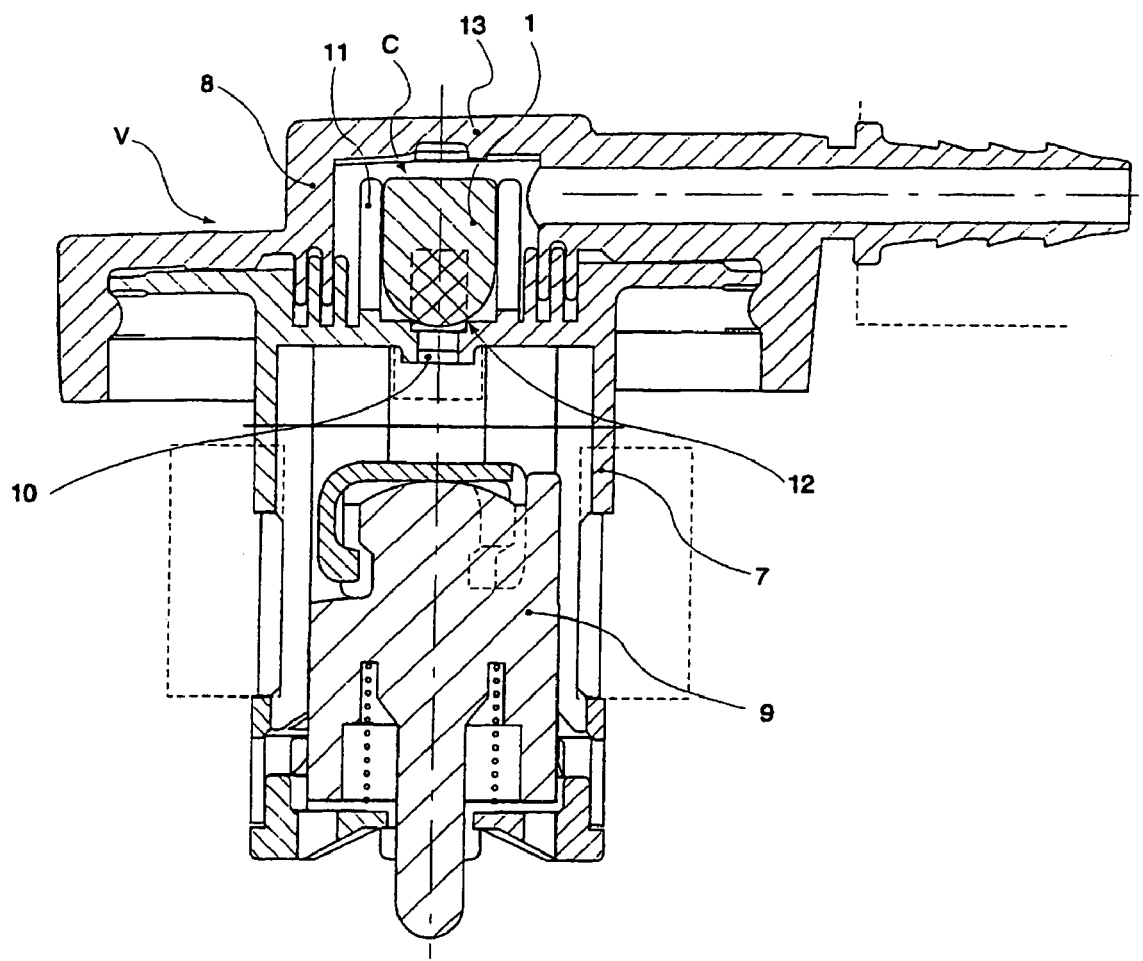
FIG. 2 shows a cross-sectional view of integration of said valve in the non-return valve.

FIG. 2 shows said valve (C) integrated in a non-return valve (V), consisting essentially of a main body (7), attached to and traversing the upper wall of the fuel tank perpendicularly, and a cap (8) provided with lines and inserts that permit connection to admission tubes/escape tubes to other components of the circuit. Without going into details, which do not directly concern the invention that is the subject of this text, the body (7) of the non-return valve (V) contains a float (9) that permits the orifice (10) to be blocked in the case of turnover of the vehicle, or when the filling level of the tank brings it in contact with said orifice (10).

The body (1) of valve (C) is arranged between the guide walls (1 1) for translatory movement to permit axial displacement of valve (C), limited in the lower part by seat (12), arranged at the upper level of orifice (10), and in the upper part by the upper wall (13) of cap (8). As is apparent in this figure, the vertical guide walls (11) are not solid, but have recesses that permit fluid to pass through under certain conditions.

Figures 3A, 3B, 3C:
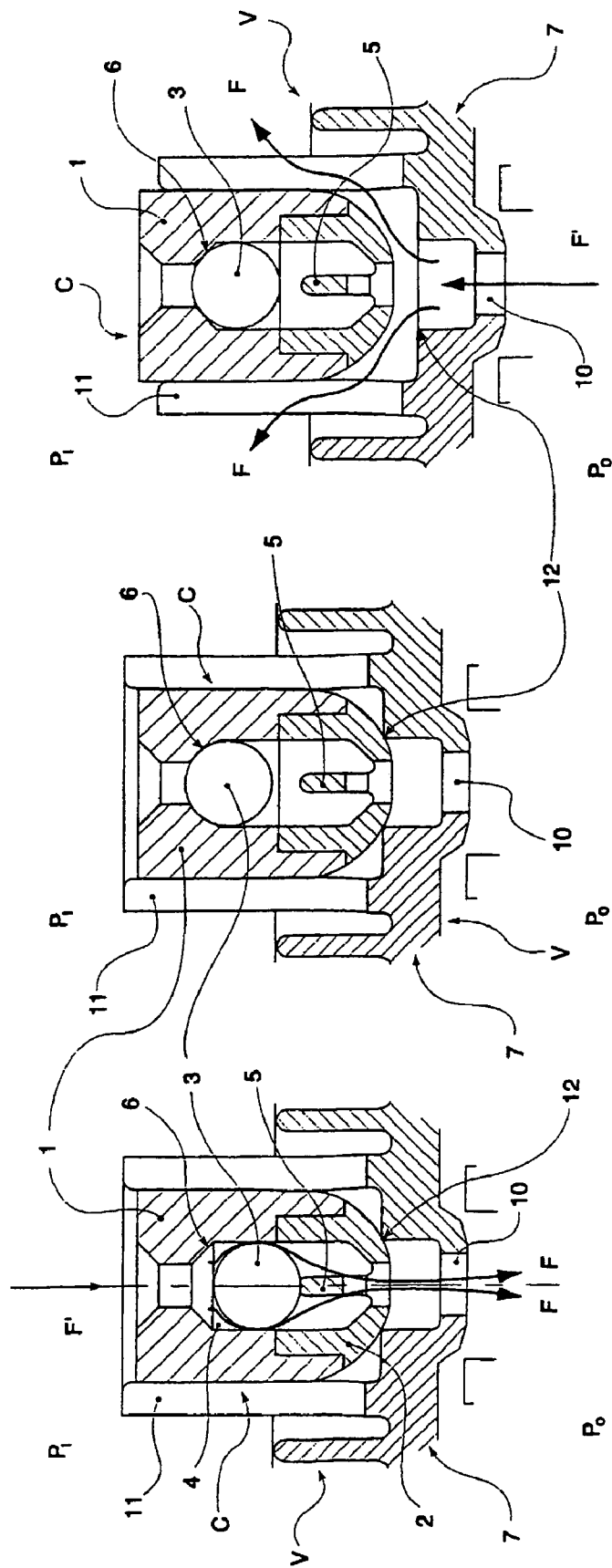
FIGS. 3a to 3c show, always in cross section, an enlarged detail of combined operation of the valve of the invention on its seat in the non-return valve.

The enlarged detail of the relative positions of the seat (12) arranged in the upper part of body (7) of the non-return valve and the means of guiding (11) of valve (C) of the invention are apparent in FIGS. 3a to 3c. FIG. 3a shows a case, where the internal pressure of the tank is less than the external pressure. In other words, there is an underpressure created within the tank. In this case, the ball (3), since it rests on the stop (5) of the lower part (2) of valve (C), air coming from the exterior flows through, owing to the existence of a clearance between ball (3) and the central part of recess (4).

The direction of flow of fluid is shown by the arrows (F, F'). This flow is possible, because the lines made in the lower part (2) are not blocked.

In the depiction of FIG. 3b, the pressure within the tank becomes equal to or slightly greater than the external pressure. In this case, a force is exerted on the ball (3), which is pushed against the upper seat (6) of the main body (1), especially because of the loss of charge created between the walls of recess (4) and ball (3), which generates aspiration of the latter. Since this force is not sufficient to separate valve (C) from the lower seat (12), no gas flow can be produced. Gas flow is consequently zero. In this situation, the pressure differential is less than the pressure threshold that is reached in FIG. 3c. In this case, the force that is exerted on valve (C) is sufficient to separate it from seat (12) and fluid can flow in the opposite direction, in which it flows in FIG. 3a, this time from the interior of the tank to the exterior. The tank is under a gas overpressure. The arrows F and F' are oriented in a direction opposite to those of FIG. 3a.

In FIGS. 3a and 3b, the body (1) of valve (C) is fixed in the guide means (11). When the internal pressure of the tank continues to increase, there is a threshold valve, beyond which valve (C) slides from its seat (12) and therefore permits positive flow through orifice (10). This pressure is naturally dependent on the weight of the valve and on the diameter of its seat in body (7) of valve (V). The means of guiding (11) ensure purely axial guiding of the body (1) of valve (C) in this case.

Figure 4:
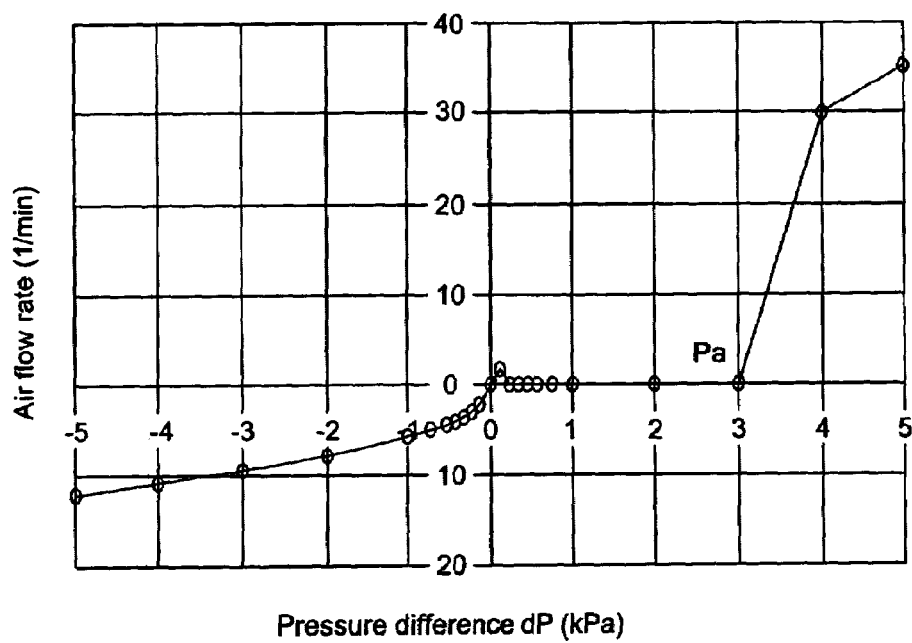
FIG. 4 shows the flow rate curve as a function of the pressure difference in the three cases illustrated in the preceding figures.

The value of the threshold, beyond which valve (C) slides from seat (12), is denoted $P_a$ in FIG. 4, which illustrates the flow/pressure difference diagram. In the particular example shown, the flow rate becomes positive from 3 kPa, the threshold valve $P_a$.

The advantages of valve (C) of the invention have already been mentioned, but it is easy to comprehend, by virtue of the detailed description, that this solution permits reduced space requirements to be achieved with a mechanism that requires only three parts and can be installed as module in a non-return valve. One therefore combines functions that thus far have been accomplished with disconnected valves, thus ensuring, on the one hand, non-return functions, i.e., preventing overfilling, and the traditional pressure equalization functions between the interior and exterior of the tank.

The solution described above, however, is only a non-limiting example of the invention, which covers all the variants of form and configuration familiar to one skilled in the art.

The invention claimed is:

1. A control valve (C) of the internal gas pressure of a liquid tank, cooperating with an orifice (10) made in the upper part of the tank, permitting gas flow to the exterior of the tank, when the difference between the internal pressure and external pressure reaches a predetermined threshold, and inverse flow, when the internal pressure in the tank is less than the external pressure, comprising:
   a body (1), whose lower part is configured to block orifice (10) of the tank with a weight, so that, beyond said differential pressure value, which represents the predetermined threshold, body (1) is separated from the orifice (10),
   wherein said body (1) also contains a recess (4) arranged in the continuity of and substantially axially aligned with the orifice (10) of the tank when the body and the orifice are in contact, said recess (4) being equipped with means of blocking (3) that are activated when the differential pressure between the tank and atmosphere is positive.

2. The control valve (C) of the internal gas pressure of a tank according to claim 1, wherein the means of blocking of the body (1) of valve (C) consists of a mobile device (3) that is free to move in translatory fashion with radial clearance in a central portion of the recess (4), and can cooperate with a seat (6) arranged in the upper part of said portion to block the upper part of recess (4), said mobile device (3) being able to rest in the lower part of said central portion on a lower stop (5), without blocking at least one line that forms the lower part of the recess (4), the mobile device (3) having a weight and the configuration of the central portion of the recess (4), having a configuration so that when the internal pressure of the tank exceeds the external pressure, it is forced against the upper seat (6).

3. The control valve (C) of the internal gas pressure of a tank according to claim 2, wherein said device consists of a ball (3) that can be moved in a central cylindrical portion of the traversing recess (4).

4. The control valve (C) of the internal gas pressure of a tank according to claim 3, wherein the ball (3) is made of glass with a polished surface.

5. The control valve (C) of the internal gas pressure of a tank according to claim 1, wherein the body (1) is cylindrical with an essentially hemispherical lower end, the recess (4) being made in the axial direction of said body (1).

6. The control valve (C) of the internal gas pressure of a tank according to claim 1, wherein the lower stop (5) and the line or lines forming the lower part of the traversing recess are made on a distinct part (2), fixed tightly onto the body (1) of valve (C).

7. The control valve (C) of the internal gas pressure of a tank according to claim 1, wherein the body (1) is made of machined brass, whereas part (2) containing lower stop (5) is made of molded plastic.

8. A fuel tank comprising:
   an orifice (10) is equipped on an outside surface of the tank;
   a control valve (C) of the internal gas pressure of the fuel tank that cooperates with the orifice (10), the control valve permitting gas flow to the exterior of the tank, when the difference between the internal pressure and external pressure reaches a predetermined threshold, and inverse flow, when the internal pressure in the tank is less than the external pressure, comprising:
   a body (1), whose lower part is configured to block orifice (10) of the tank with a weight, so that, beyond said differential pressure value, which represents the predetermined threshold, body (1) is separated from the orifice (10),
   wherein said body (1) also contains a recess (4) arranged in the continuity of and substantially axially aligned with the orifice (10) of the tank when the body and the orifice are in contact, said recess (4) being equipped with means of blocking (3) that are activated when the differential pressure between the tank and atmosphere is positive; and
   means of guiding (11) of the body (1) of valve (C) in translatory motion.

9. The control valve (C) of claim 1, wherein the control valve is a non-return valve arranged in the upper wall of a tank, and whose body (7) contains, at the outside output of orifice (10) of the connection to the internal volume of the tank, means of guiding valve (C) in translatory motion.

10. Application of the control valve (C) according to claim 9, wherein the tank is a fuel tank for a vehicle with a heat engine.

* * * * *